Patented Feb. 10, 1931

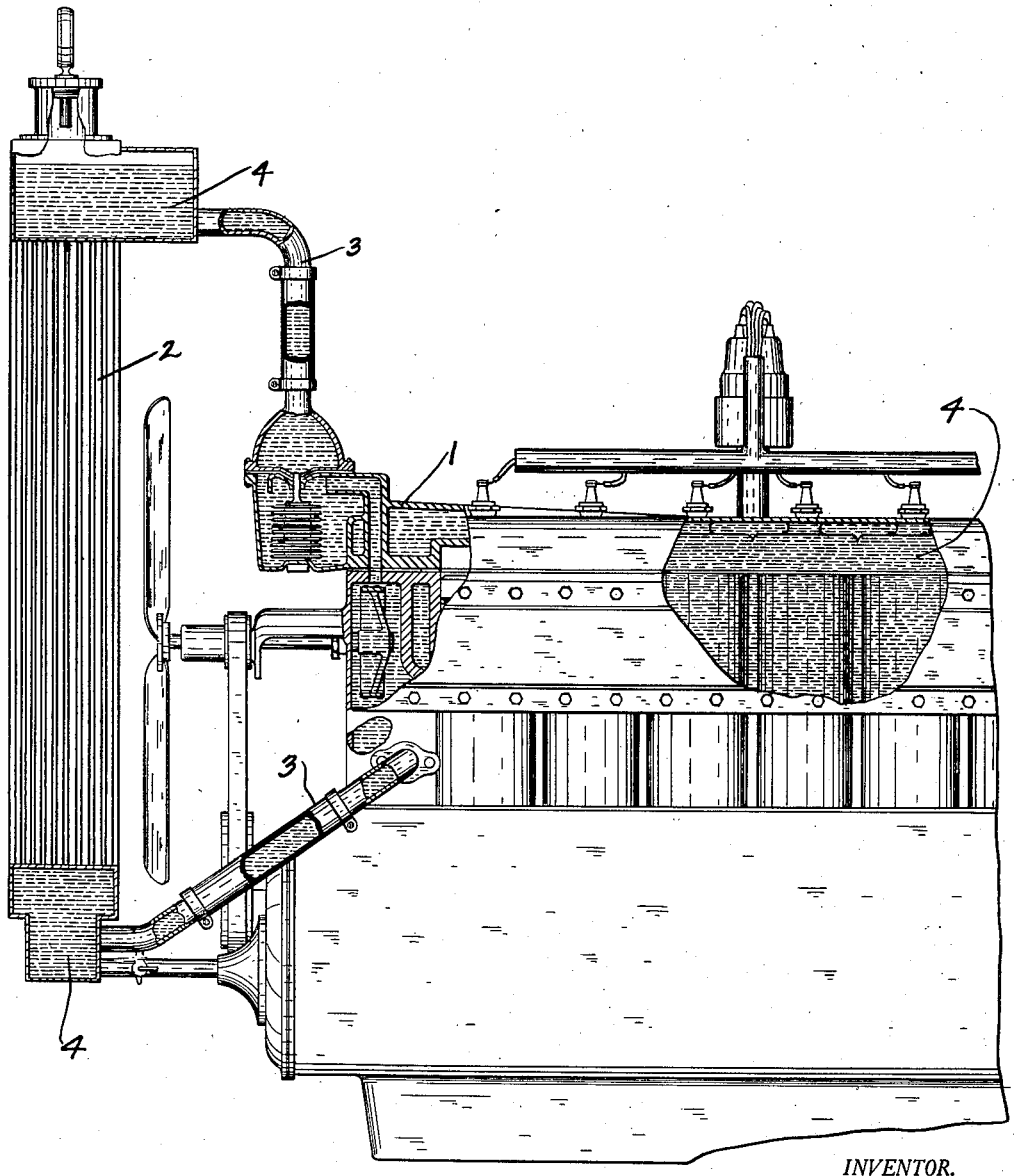

1,791,818

UNITED STATES PATENT OFFICE

DAN J. KILLEN, OF CHICAGO, ILLINOIS, ASSIGNOR TO WALDEMAR C. WEHE, OF MILWAUKEE, WISCONSIN

LIQUID-CIRCULATING HEAT-TRANSFER SYSTEM

Application filed February 13, 1928. Serial No. 253,965.

This invention relates to improvements in liquid circulating heat transfer systems and is directed principally to an engine cooling system.

It is the principal object of this invention to provide a heat transfer system in which the circulating medium is insoluble in water; is non-electrolytic in its action upon metal; will not attack rubber or fabrics; will not ionize; and will act as a protective agent to the surfaces of such metals, rubber or fabrics as it may come into contact with.

It also is an object to provide a heat transfer system in which the circulating medium will not freeze above 50° below zero centigrade or boil below 290° above zero centigrade, which will be substantially free from evaporation below the boiling point; and which will not form scale deposits upon the liquid confining walls of the system.

In the drawing, the figure illustrated is that of a cooling system of an internal combustion engine having a liquid embodying the characteristics indicated.

The cooling system shown in the accompanying drawing is adapted for an automobile engine and comprises an engine cooling jacket 1, radiator 2 and connections 3 between the jacket 1 and radiator 2. Portions of the system are broken away to show the cooling fluid 4 which absorbs heat from the engine cylinders and gives it off at the radiator. The circulating liquid is known as diethyl phthalate $(C_2H_5)_2C_6H_4(CO)_2O_2$ and is a by-product of grain alcohol. It is of an oily nature and will not thicken or freeze above 50 degrees below zero centigrade. Consequently it is well adapted for engine cooling purposes during winter months. This liquid is used in its undiluted form and in fact cannot be mixed with either glycerin or water. Under all temperatures between 50 degrees below zero centigrade and 290 degrees above zero centigrade, this liquid will remain a comparatively free, thin flowing liquid.

Diethyl phthalate is also admirably adapted for engine cooling purposes during summer months. This result follows from the fact that the liquid here disclosed will not to any appreciable degree evaporate below 290 degrees above zero centigrade. It is observed from the foregoing that this liquid has a much greater temperature range within which it may satisfactorily perform its cooling service than any liquids heretofore used in cooling systems.

Other desirable properties which it has been discovered that diethyl phthalate embodies, are its inability to transmit electrical currents consequently it will not become ionized and its inability to attach metal, rubber or fabric such as are usually found in cooling systems. Diethyl phthalate will not deposit ary material upon the surfaces confining it. Consequently the heat transferring surfaces of the engine and the radiator will remain unimpaired and the cooling liquid will be in intimate contact with the walls of the cooling system.

From the foregoing disclosure it is apparent that a cooling liquid for cooling systems has been provided which is adapted for summer and winter use in an automobile cooling system, which will not evaporate at ordinary temperatures encountered in such cooling systems, which will not deposit a coating on the surfaces of the cooling systems, which is a non-conductor of electrical currents, which will not ionize, and which as a result of the foregoing characteristics will protect the surfaces with which it comes in contact.

While I have disclosed the cooling liquid in combination with an automobile engine cooling system, it will be understood that this liquid may be used in a refrigerating system or in a heating system. The principle of operation is the same, since the object in either case is figuratively to extract heat from one portion of the circulatory system and to deliver it at another portion of the system.

I claim:

1. In combination with a heat exchange system, a heat exchange element, said element containing diethyl phthalate $$(C_2H_5)_2C_6H_4(CO)_2O_2.$$

2. In combination with an internal combustion engine, a heat exchange element, said element containing diethyl phthalate.

3. A cooling fluid for a heat exchange system containing diethyl phthalate.

DAN J. KILLEN.